United States Patent
Petri et al.

(10) Patent No.: US 12,460,141 B2
(45) Date of Patent: Nov. 4, 2025

(54) PROCESS AND APPARATUS FOR HYDROPROCESSING A PARAFFINIC FEEDSTOCK

(71) Applicant: UOP LLC, Des Plaines, IL (US)

(72) Inventors: John Anthony Petri, Wauconda, IL (US); Geoffrey William Fichtl, Chicago, IL (US); Joseph Kozlowski, Brookfield, IL (US); Jan de Ren, Arlington Heights, IL (US); Dhineshkumar Kandaraj, Calgary (CA)

(73) Assignee: UOP LLC, Rosemont, IL (US)

( * ) Notice: Subject to any disclaimer, the term of this patent is extended or adjusted under 35 U.S.C. 154(b) by 0 days.

(21) Appl. No.: 18/818,133

(22) Filed: Aug. 28, 2024

(65) Prior Publication Data
US 2025/0075136 A1    Mar. 6, 2025

Related U.S. Application Data

(60) Provisional application No. 63/580,275, filed on Sep. 1, 2023.

(51) Int. Cl.
*C10G 65/12* (2006.01)
*B01J 8/04* (2006.01)
*B01J 23/44* (2006.01)

(52) U.S. Cl.
CPC ............ *C10G 65/12* (2013.01); *B01J 8/0453* (2013.01); *B01J 23/44* (2013.01);
(Continued)

(58) Field of Classification Search
CPC ............ C10G 65/12; C10G 2300/1014; C10G 2300/1018; C10G 2300/1022; C10G 2300/1081; C10G 2300/4006; C10G 2300/4012; C10G 2300/4081; C10G 2300/70; C10G 2400/04; C10G 2400/08; B01J 8/0453
See application file for complete search history.

(56) References Cited

U.S. PATENT DOCUMENTS

| 8,329,968 B2 | 12/2012 | Brandvold et al. |
| 8,471,079 B2 | 6/2013 | Brandvold et al. |

(Continued)

*Primary Examiner* — Randy Boyer
*Assistant Examiner* — Juan C Valencia
(74) *Attorney, Agent, or Firm* — Paschall and Associates, LLC; James C. Paschall

(57) ABSTRACT

A process for hydroprocessing a sustainable feedstock is disclosed. The process comprises hydrocracking a hydrocracking feed stream comprising greater than 90% paraffins in a hydrocracking reactor in the presence of hydrogen over a hydrocracking catalyst comprising one or more Group VIII metal and/or Group VIB to provide a hydrocracked stream. The hydrocracking reactor is operated at a temperature of about 290° C. (550° F.) to about 450° C. (842° F.) and a pressure of about 2.7 MPa (gauge) (400 psig) to about 20.7 MPa (gauge) (3000 psig). The hydrocracked stream is hydroisomerized in a hydroisomerization reactor in the presence of hydrogen over a hydroisomerization catalyst to provide a hydroisomerized stream. The hydroisomerized stream is separated to provide a jet fuel stream, a diesel stream, and an unconverted oil stream.

17 Claims, 1 Drawing Sheet

(52) U.S. Cl.
CPC ............... *C10G 2300/1014* (2013.01); *C10G 2300/1018* (2013.01); *C10G 2300/1022* (2013.01); *C10G 2300/1081* (2013.01); *C10G 2300/4006* (2013.01); *C10G 2300/4012* (2013.01); *C10G 2300/4081* (2013.01); *C10G 2300/70* (2013.01); *C10G 2400/04* (2013.01); *C10G 2400/08* (2013.01)

(56) References Cited

U.S. PATENT DOCUMENTS

| | | | |
|---|---|---|---|
| 2005/0090700 A1* | 4/2005 | Clark | C10L 1/04 208/950 |
| 2019/0119585 A1* | 4/2019 | Dulot | C10G 49/24 |

\* cited by examiner

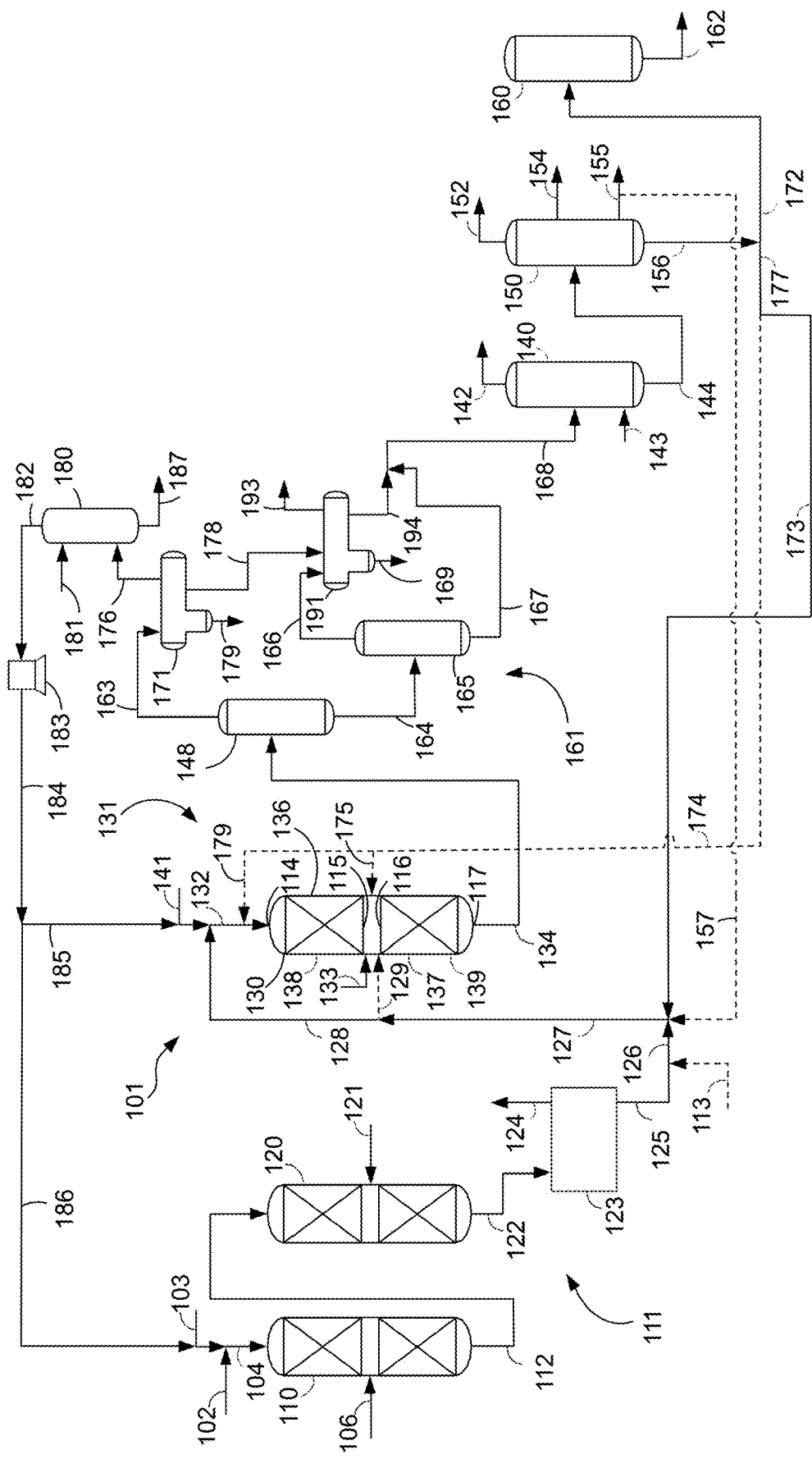

PROCESS AND APPARATUS FOR HYDROPROCESSING A PARAFFINIC FEEDSTOCK

FIELD

The field is related to a process for hydroprocessing a paraffins rich feedstock. The field may particularly relate to a process for hydroprocessing a sustainable feedstock.

BACKGROUND

As the demand for fuel increases worldwide, there is increasing interest in producing fuels and fuel blending components from sources other than crude oil. Often referred to as a biorenewable sources, these sources include, but are not limited to, plant oils such as corn, rapeseed, canola, soybean, microbial oils such as algal oils, animal fats such as inedible tallow, fish oils and various waste streams such as yellow and brown greases and sewage sludge. A common feature of these sources is that they are composed of glycerides and free fatty acids (FFA). Both triglycerides and the FFAs contain aliphatic carbon chains having from about 8 to about 24 carbon atoms. The aliphatic carbon chains in triglycerides or FFAs can be fully saturated, or mono, di or poly-unsaturated.

Hydroprocessing can include processes which convert hydrocarbons in the presence of hydroprocessing catalyst and hydrogen to more valuable products. Hydrotreating is a process in which hydrogen is contacted with hydrocarbons in the presence of hydrotreating catalysts which are primarily active for the removal of heteroatoms, such as sulfur, nitrogen, oxygen and metals from the hydrocarbon feedstock. In hydrotreating, hydrocarbons with double and triple bonds such as olefins may be saturated.

The production of hydrocarbon products in the diesel boiling range can be achieved by hydrotreating a biorenewable feedstock. A biorenewable feedstock can be hydroprocessed by hydrotreating to deoxygenate, including decarboxylate and decarbonylate, the oxygenated hydrocarbons. Hydrotreating may be followed by hydroisomerization to improve cold flow properties of product diesel and jet fuel. Hydroisomerization or hydrodewaxing is a hydroprocessing process that increases the alkyl branching on a hydrocarbon backbone in the presence of hydrogen and hydroisomerization catalyst to improve cold flow properties of the hydrocarbon. Hydroisomerization includes hydrodewaxing herein.

Hydrocracking is a hydroprocessing process in which hydrocarbons crack in the presence of hydrogen and hydrocracking catalyst to lower molecular weight hydrocarbons. Depending on the desired output, a hydrocracking unit may contain one or more beds of the same or different catalyst.

Sustainable technologies are developing and commercializing routes to synthesize paraffins from sustainable or renewable sources of carbon and hydrogen. However, the product of the synthesis of these paraffins is not usually suitable for production of sustainable aviation fuel (SAF), diesel and lubricant oil. The synthesis of these paraffins can produce paraffins of sufficiently higher carbon numbers that are problematic for meeting fuel specifications such as freeze point and pour point.

The prior art utilizes hydrocracking catalysts and adjustment of recycle or unconverted oil cut point in the hydrocracking process to reduce the carbon number, increase the extent of hydrocracking severity, and consequently increase the isomer content of the resultant product fuel streams.

The Fischer-Tropsch process has been widely used to assist in the formation of hydrocarbons. As is generally known, the Fischer-Tropsch process converts hydrogen and carbon monoxide (commonly known as syngas) into liquid hydrocarbons, examples of which include hydrocarbons in the boiling ranges of naphtha, kerosene, diesel, and paraffinic wax. As a precursory step to Fischer-Tropsch synthesis, the coal, gas, or a biomass such as a biochar, municipal solid waste, crops or agricultural residue, forest residue, energy crops, wastewater sludge, sewage etc. is thermally gasified using heat and pressure to produce the syngas which results in turning the feedstock into hydrogen and carbon monoxide. Another exemplary precursory step may acquire carbon dioxide directly from carbon dioxide emitting sources such as a combustion process, a carbonate calcination process to make cement, catalyst regeneration processes as such from fluid catalytic cracking regenerators. Carbon dioxide may also be acquired directly from atmospheric air via direct air capture technologies. Hydrogen as a syngas component may be obtained from electrolysis of water or the pyrolysis of bio-methane. As a result of the Fischer-Tropsch technique, the synthesis of hydrocarbons is very appealing from an environmental point of view, since they are paraffinic in nature and substantially devoid of contamination such as organic sulfur and organic nitrogen compounds.

As refiners seek to add capability for processing sustainable feedstocks, processes are sought to produce greater volumes of jet fuel due to its high value and demand. Processes for producing diesel and increased yield of jet fuel from sustainable feedstocks are desired. Furthermore, the production of very high-quality base oil meeting critical lube properties from sustainable feedstocks will become a growing market.

SUMMARY

The process and apparatus produce a diesel stream from a sustainable feedstock comprising hydrotreating a feedstock to remove heteroatoms, hydrocracking to reduce carbon numbers and provide jet fuel range material, and hydroisomerizing to improve cold flow properties. The disclosed process converts paraffins into sustainable distillates meeting fuel specifications such as freeze point, cloud point and pour point and also produces a base oil suitable as a lubricant oil component. The present disclosure significantly decouples the effect of hydrocracking carbon number reduction to increase the extent of isomerizing and improve cold flow properties by using a single reaction stage for hydrocracking and hydroisomerizing the feed stream.

BRIEF DESCRIPTION OF THE DRAWINGS

The FIG. 1s a simplified flow diagram of the process and apparatus for hydroprocessing a sustainable feedstock in accordance with the present disclosure.

Definitions

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through a fractionation or conversion unit to undergo a compositional change due to physical fractionation or chemical conversion.

The term "indirect communication" means that flow from the upstream component enters the downstream component after passing through a fractionation or conversion unit to undergo a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns may omit a reboiler at a bottom of the column and instead provide heating requirements and separation impetus from a fluidized inert media such as steam. Stripping columns typically feed a top tray and take main product from the bottom.

As used herein, the term "a component-rich stream" means that the rich stream coming out of a vessel has a greater concentration of the component than the feed to the vessel.

As used herein, the term "a component-lean stream" means that the lean stream coming out of a vessel has a smaller concentration of the component than the feed to the vessel.

As used herein, the term "boiling point temperature" means atmospheric equivalent boiling point (AEBP) as calculated from the observed boiling temperature and the distillation pressure, as calculated using the equations furnished in ASTM D86 or ASTM D2887.

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "T5" or "T95" means the temperature at which 5 mass percent or 95 mass percent, as the case may be, respectively, of the sample boils using ASTM D-86 or TBP.

As used herein, the term "initial boiling point" (IBP) means the temperature at which the sample begins to boil using ASTM D2887, ASTM D-86 or TBP, as the case may be.

As used herein, the term "end point" (EP) means the temperature at which the sample has all boiled off using ASTM D2887, ASTM D-86 or TBP, as the case may be.

As used herein, the term "jet fuel range material" means hydrocarbons boiling in the range of an IBP between about 85° C. (185° F.) and about 135° C. (275° F.) or a T5 between about 110° C. (230° F.) and about 160° C. (320° F.) and the "jet cut point" between jet fuel and diesel comprising a T95 between about 295° C. (563° F.) and about 315° C. (599° F.) using the TBP distillation method. Hydrocarbons beyond the "jet cut point" and up to the "diesel cut point", comprising a T95 between about 343° C. (650° F.) and about 399° C. (750° F.) are the "diesel boiling range" material using the TBP distillation method. A "recycle cut point" can be a jet cut point or a diesel cut point. Hydrocarbons that boil above the recycle cut point by convention are unconverted hydrocarbons since these hydrocarbons are not converted to boil below the recycle cut point, which may also be considered to be a "conversion" cut point using the TBP distillation method. Hydrocarbons that boil below jet range fuel material comprise naphtha and LPG.

As used herein, the term "conversion" means the ratio of product that boils below a recycle cut point to the hydrocarbons that boils at or above the recycle cut point. The conversion can also be expressed as a difference of 100 percent of the feed minus the percent of unconverted oil on a feed basis.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

As used herein, the term "$C_x$" is to be understood to refer to molecules having the number of carbon atoms represented by the subscript "x". Similarly, the term "$C_x-$" refers to molecules that contain less than or equal to x and preferably x and less carbon atoms. The term "$C_x+$" refers to molecules with more than or equal to x and preferably x and more carbon atoms.

As used herein, the term "carbon number" refers to the number of carbon atoms per hydrocarbon molecule and typically a paraffin molecule.

DETAILED DESCRIPTION

The present disclosure provides a process and apparatus for hydroprocessing a sustainable feedstock. The process includes a single reaction stage for hydrocracking and hydroisomerizing the feed stream. Running both the hydrocracking and hydroisomerizing in a single stage saves capital by reducing the required number of units and also produces jet fuel that meets the required inter alia cold flow requirements.

With growing emphasis on environmental considerations, it has become more and more attractive for refiners to produce lower carbon footprint, or "green" fuels as part of their portfolio to maximize their profitability from Renewable Identification Numbers (RINs) credited under the Renewable Fuel Standard Program. RINs are credits used for compliance which can be traded within the program to increase profitability. The utilization of carbon dioxide from carbon dioxide emitting sources and its reforming into syngas also indirectly recycles carbon dioxide through the Fischer-Tropsch synthesis process. The direct utilization of carbon dioxide can garner associated impetus and other government incentives. The present disclosure enables refiners to produce jet fuel which meets the jet fuel specifications with increased jet fuel yield.

In the FIGURE, in accordance with an exemplary embodiment, a process and apparatus 101 is shown for hydroprocessing a sustainable feedstock. The sustainable feedstock may be a Fischer-Tropsch feedstock or a biorenewable feedstock. The process for hydroprocessing a sustainable feedstock comprises a hydrotreating section 111 and a hydroprocessing section 131. A feed line 102 transports a feed stream of fresh sustainable feedstock to the hydrotreating section 111. The sustainable feedstock may be blended with a mineral feed stream but preferably comprises a predominance of or all sustainable feedstock. A mineral feedstock is a conventional feedstock derived from crude oil that is extracted from the ground.

The biorenewable feedstock may comprise a nitrogen concentration of about 50 wppm to about 800 wppm. The biorenewable feedstock may comprise high oxygen content which can be up to 12 wt %. The biorenewable feedstock may also comprise about 1 to about 500 wppm sulfur, typically no more than about 200 wppm sulfur. A variety of different biorenewable feedstocks may be suitable for the process 101. The term "biorenewable feedstock" is meant to include feedstocks other than those obtained from crude oil. The biorenewable feedstock may include any of those feedstocks which comprise at least one of glycerides and free fatty acids. Most glycerides will be triglycerides, but monoglycerides and diglycerides may be present and processed as well. Free fatty acids may be obtained from phospholipids which may source phosphorous in the feedstock. Examples of these biorenewable feedstocks include, but are not limited to, camelina oil, canola oil, corn oil, soy oil, rapeseed oil, soybean oil, colza oil, tall oil, sunflower oil, hempseed oil, olive oil, linseed oil, coconut oil, castor oil, peanut oil, palm oil, mustard oil, tallow, yellow and brown greases, lard, train oil, fats in milk, fish oil, algal oil, sewage sludge, and the like. Additional examples of biorenewable feedstocks include non-edible vegetable oils from the group comprising Jatropha curcas (Ratanjot, Wild Castor, Jangli Erandi), Madhuca indica (Mohuwa), Pongamia pinnata (Karanji, Honge), calophyllum inophyllum, moringa oleifera and Azadirachta indica (Neem). The triglycerides and FFAs of the typical vegetable or animal fat contain aliphatic hydrocarbon chains in their structure which have about 8 to about 30 carbon atoms. As will be appreciated, the biorenewable feedstock may comprise a mixture of one or more of the foregoing examples. The biorenewable feedstock may be pretreated to remove contaminants and filtered to remove solids.

Another source of sustainable feedstock comes from the production of normal paraffins comprising $C_1$-$C_{100}$ carbons utilizing a Fischer-Tropsch (F-T) synthesis process. The Fischer-Tropsch process is particularly useful since the resultant paraffins stream is relatively devoid of organic sulfur and organic nitrogen components that are typically associated with the same petroleum-based fuel. The synthesis gas used for a F-T synthesis process can be generated utilizing carbon dioxide emitted from carbon dioxide generating sources such as burning fuels, the calcination of carbonates used to make cement and the like. The hydrogen for the generation of F-T synthesis gas can be provided through steam methane reforming (SMR), partial oxidation (POX), autothermal reforming and the electrolysis of water. A raw syngas is treated in various steps of scrubbing units and guard units to create a syngas relatively free of sulfur and nitrogen containing components, suitable for use in an F-T synthesis unit. The syngas is then transferred to a F-T reactor to produce the hydrocarbons and water. The F-T synthesis catalyst and operating conditions can also be selected to significantly reduce the inclusion of organic oxygenates and olefins. The F-T synthesis process can produce a product stream comprising $C_1$ to $C_{100}$ normal paraffins. The F-T synthesis process generates different carbon number distributions of paraffins, and preferentially normal-paraffins, with skewed normal distributions characterized by an alpha value. Operating the F-T synthesis at different alpha values can skew the median carbon number in the product F-T liquids and wax streams. The F-T synthesis process can produce normal paraffins and carbon numbers that create non-conformance with fuel specifications such as the freeze point for SAF, cloud point for diesel, distillation specifications for SAF and diesel, and the pour point for lubricants. In one example, the F-T synthesis process may produce at least two liquid product streams. One stream can substantially contain normal paraffins boiling below a recycle cut point. Another stream can substantially contain normal paraffins boiling above a recycle cut point.

In accordance with the present disclosure, the sustainable feed stream in feed line 102 is a paraffin rich feed stream to the process 101. Paraffins, and preferentially normal paraffins may be synthetically produced using sustainable or biorenewable sources. One such example is the hydrotreatment of *Nitzschia*, i.e., ovalis algae, that would produce normal paraffins with an abundance of 30 wt % $C_{20}$ normal paraffins. Other triglycerides can be hydrotreated to produce normal paraffins. The sustainable feed stream in feed line 102 may comprise $C_1$ to $C_{100}$ n-paraffins obtained from a Fischer-Tropsch (F-T) synthesis process. $C_{19+}$ normal paraffins would create a SAF that exceeds the final boiling point and freeze point specifications.

In the disclosed process and apparatus for hydroprocessing a sustainable feedstock, the paraffins, and preferentially n-paraffins, are processed in a single reaction stage of hydroprocessing comprising a hydrocracking zone followed by a hydroisomerization zone. In an aspect, a portion of the paraffins may be fed to the hydrocracking zone and a portion of the paraffins may be fed to the hydroisomerization zone.

In the disclosed process and apparatus, the hydroisomerization severity is adjusted to meet the cold flow property specifications of the resultant distillate fuels and unconverted oil streams. The hydroisomerization effluent is fractionated into product streams comprising SAF, diesel, and an unconverted oil. The unconverted oil can be a base oil meeting lubricant properties such as pour point, Noack volatility and absolute viscosity. The unconverted oil can comprise higher carbon number isomerized paraffins boiling above the recycle cut point that may be recycled to the hydrocracking reaction zone.

The hydrocracking zone reduces the carbon number of the paraffins into carbon numbers suitable for meeting the distillation specifications of SAF and diesel. The hydrocracking zone can also reduce the carbon number of the paraffins to reduce the absolute viscosity of the resultant unconverted oil to lower preferred values meeting base oil specifications. The hydrocracking zone effluent is in upstream communication with the downstream hydroisomerization zone. The hydrocracking zone effluent is hydroisomerized in the hydroisomerization zone. In an embodiment, the entire hydrocracking zone effluent is hydroisomerized in the hydroisomerization zone.

In an embodiment, the whole portion of paraffins is a feed to the hydroisomerization zone. In another embodiment, the paraffins are fed entirely to the hydrocracking zone. The hydroisomerization zone may be in direct, downstream communication with the hydrocracking zone. Another feed component to the hydrocracking zone may comprise a recycled oil from the hydroisomerization reaction zone as previously described. In yet another embodiment, lower carbon number paraffins meeting the distillation specifications of SAF and diesel are a feed to the hydroisomerization zone and higher carbon number paraffins not meeting the distillation specifications of SAF and diesel are a feed to the hydrocracking zone. The process and apparatus 101 eliminate the requirement for an independent hydroisomerization unit and its associated capital and operating costs.

Referring back to the process and apparatus 101, the sustainable feed stream in feed line 102 may flow from a feed surge drum to the hydrotreating section 111. In accordance with the present disclosure, the hydrotreating section 111 may include a guard bed reactor 110 and a hydrotreating reactor 120. The sustainable feed stream in feed line 102 may be combined with a hydrogen gas stream in line 103 to provide a combined sustainable feed stream in line 104. The combined sustainable feed stream in line 104 is passed to the guard bed reactor 110. Alternately, the sustainable feed stream in feed line 102 and the hydrogen gas stream in line 103 may be passed separately to the guard bed reactor 110. In an aspect, the sustainable feed stream in feed line 102 may include a heated sustainable feed stream.

The guard bed temperature of the guard bed reactor 110 may range between about 246° C. (475° F.) and about 343° C. (650° F.) or between about 288° C. (550° F.) and about 304° C. (580° F.). The guard bed reactor 110 is operated low enough to prevent olefins in the feed stream from polymerizing but high enough to foster olefin saturation, hydrodemetallation, hydrodeoxygenation, including hydrodecarbonylation and hydrodecarboxylation, hydrodesulfurization and hydrodenitrification reactions to occur.

The guard bed can comprise a base metal on a support. Base metals useable in this process include non-noble metals, nickel, chromium, molybdenum and tungsten. Other base metals that can be used include tin, indium, germanium, lead, cobalt, gallium and zinc. The process can also use a metal sulfide, wherein the metal in the metal sulfide is selected from one or more of the base metals listed. The sustainable feedstock can be charged through the base metal catalysts at pressures from 1379 kPa (abs) (200 psia) to 6895 kPa (abs) (1000 psia). In a further embodiment, the guard bed catalyst can comprise a second metal, wherein the second metal includes one or more of the metals: tin, indium, ruthenium, rhodium, rhenium, osmium, iridium, germanium, lead, cobalt, gallium, zinc and thallium. A nickel molybdenum on alumina catalyst may be a suitable catalyst in the guard bed reactor 110. Multiple guard beds may be contained in the guard bed reactor 110 such as two, three or more. A hydrogen quench stream from a hydrogen quench line 106 may be injected at interbed locations to control temperature exotherms.

A contacted sustainable feed stream is discharged from the guard bed reactor 110 in a contacted feed line 112. In the guard bed reactor 110, most of the hydrodemetallation and hydrodcoxygenation, including hydrodecarbonylation and hydrodecarboxylation, reactions will occur with some hydrodenitrogenation and hydrodesulfurization occurring. Metals removed will include alkali metals and alkali earth metals and phosphorous. The contacted sustainable feed stream in line 112 may be passed to the hydrotreating reactor 120.

In an aspect, the contacted sustainable feed stream may be heated to increase the temperature of the contacted sustainable feed stream before passing the contacted sustainable feed stream in line 112 to the hydrotreating reactor 120. The heated, contacted sustainable feed stream is charged to a hydrotreating reactor 120 of the hydrotreating reactor section 111.

In the hydrotreating reactor 120, the heated, contacted sustainable feed stream in line 112 is contacted with a hydrotreating catalyst in the presence of hydrogen at hydrotreating conditions to saturate the olefinic or unsaturated portions of the n-paraffinic chains in the sustainable feedstock. The hydrotreating catalyst also catalyzes hydrodeoxygenation reactions, including hydrodecarboxylation and hydrodecarbonylation reactions, to remove oxygenate functional groups from the hydrocarbon molecules in the sustainable feedstock which are converted to water and carbon oxides. The hydrotreating catalyst also catalyzes hydrodesulfurization of organic sulfur and hydrodenitrogenation of organic nitrogen in the sustainable feedstock. Essentially, the hydrotreating reaction removes heteroatoms from the hydrocarbons and saturates olefins in the feed stream.

The hydrotreating catalyst may be provided in one, two or more beds. A hydrotreating hydrogen quench stream from a hydrotreating hydrogen quench line 121 may be passed at an interbed location of the hydrotreating reactor 120. In an exemplary embodiment, two hydrotreating catalyst beds are shown in the FIGURE. However, the hydrotreating reactor 120 may include more than two catalyst beds or a single hydrotreating catalyst bed.

The hydrotreating catalyst may comprise nickel, nickel and molybdenum, or cobalt and molybdenum dispersed on a high surface area support such as alumina. Other catalysts include one or more noble metals dispersed on a high surface area support. Non-limiting examples of noble metals include platinum and/or palladium dispersed on an alumina support such as gamma-alumina. Suitable hydrotreating catalysts include BDO 200, BDO 300 or BDO 400 available from UOP LLC in Des Plaines, Illinois. The hydrotreating reaction temperature may range from between about 343° C. (650° F.) and about 427° C. (800° F.) and preferably between about 349° C. (690° F.) and about 400° C. (752° F.). Generally, hydrotreating conditions include a pressure of about 700 kPa (100 psig) to about 21 MPa (3000 psig).

A hydrotreated stream is produced in a hydrotreated line 122 from the hydrotreating reactor 120 of the hydrotreating reactor section 111 comprising a hydrocarbon fraction which has a substantial n-paraffin concentration. Oxygenate concentration in the hydrocarbon fraction is essentially nil, whereas the olefin concentration is substantially reduced relative to the contacted sustainable feed stream. The organic sulfur concentration in the hydrocarbon fraction is no more than 500 wppm and the organic nitrogen concentration in the hydrocarbon fraction is less than 10 wppm.

The hydrotreated stream in the hydrotreated line 122 may be separated to provide a hydrotreated vapor stream and a hydrotreated liquid stream having a smaller oxygen concentration than the sustainable feed stream. In an aspect, the hydrotreated stream in the hydrotreated line 122 may be passed to a separation section 123 to provide a hydrotreated vapor stream in line 124 and a hydrotreated liquid stream in line 125 having a smaller oxygen concentration than the sustainable feed stream 102. In an exemplary embodiment, the separation section 123 may include a hot separator, one or more additional separators and/or a stripper column. In accordance with the present disclosure, the hydrotreated vapor stream in line 124 may be withdrawn and processed to provide one or more of the hydrogen gas stream in line 103, the hydrogen quench stream in line 106, and the hydrotreating hydrogen quench stream in line 121. A liquid stream from the separation section 123 may be recycled to the hydrotreating reactor 120.

A desired product, such as a transportation fuel, may be recovered or separated from the hydrotreated liquid stream in line 125. However, the hydrotreated liquid stream in line 125 comprises a higher concentration of normal paraffins, and it will possess poor cold flow properties. Accordingly, to improve the cold flow properties, the hydrotreated liquid stream in line 125 may be passed to the hydroprocessing section 131. In accordance with the present disclosure, the hydroprocessing section 131 comprises a hydrocracking reactor and a hydroisomerization reactor. In the hydroprocessing section 131, the hydrotreated liquid stream in line 125 may be contacted with a hydroisomerization catalyst in the hydroisomerization reactor under hydroisomerization conditions to hydroisomerize the normal paraffins to branched paraffins. In an aspect, a sustainable feed stream with acceptably lower organic oxygenates concentration and low concentrations of other contaminants may bypass the hydrotreating section 111 and flow in an optional line 113 into hydrotreated liquid stream in line 125. The sustainable feed stream in line 113 may be from an F-T synthesis process operating at conditions to produce an acceptably low inclusion of organic oxygenates, olefins and other contaminants detrimental to the catalysts in the hydroprocessing section 131. The sustainable feed stream in line 113 and the hydrotreated liquid stream in line 125 may be hydroprocessed in the hydroprocessing section 131. In an embodiment, the stream in line 125 may comprise hydrotreated liquid stream in line 125 and/or a bypassed sustainable feed stream in line 113. In another embodiment, the sustainable feed stream in line 113 may be the only feed charged to the hydroprocessing section 131. A hydroprocessing charge stream is provided in line 126 which may comprise the hydrotreated liquid stream in line 125 or the sustainable feed stream in line 113 or both.

In an aspect, a hydrocracking reactor 136 and a hydroisomerization reactor 137 may be located in a single vessel. In another embodiment, the hydrocracking reactor may be stacked on the hydroisomerization reactor. In an exemplary embodiment, the hydroprocessing section 131 comprises a hydroprocessing reactor 130 comprising the hydrocracking reactor 136 and the hydroisomerization reactor 137. In another aspect, the hydrocracking reactor 136 and the hydroisomerization reactor 137 may be located in separate vessels.

Generally, the process for producing the jet fuel range material includes a separate reactor for hydroisomerizing the hydroprocessing charge stream in line 126. In the process 101, both the hydrocracking reactor 136 and the hydroisomerization reactor 137 are in a single vessel 130. The hydroprocessing charge stream in line 126 comes in contact with the hydrocracking catalyst first and forms a hydrocracked effluent stream. The whole hydrocracked effluent stream from the hydrocracking reactor 136 is passed to the hydroisomerization reactor 137. The hydroisomerization reactor may be below the hydrocracking reactor. So, the hydrocracked effluent stream is not separated into gas and liquid stream and only the liquid stream charged to the hydroisomerization reactor 137. The entirety of the hydrocracked effluent stream comprising gas and liquid components is passed to the hydroisomerization reactor 137.

The hydroprocessing charge stream in line 126 and hydrogen is passed to the hydrocracking reactor 136. Also, a recycle stream which may comprise a recycle diesel stream or an unconverted oil (UCO) may be passed to the hydroprocessing reactor 130 along with the hydrotreated liquid stream for hydrocracking.

The disclosed process of the hydrocracking reactor 136 with the hydrocracking catalyst bed 138 and the hydroisomerization reactor 137 with a hydroisomerization catalyst bed 139 produces jet fuel which meets the jet fuel specifications according to ASTM D7566. Instead of sending the hydrocracked effluent to a separation section to remove gases and perhaps fractionate product before sending a hydrocracked stream to the hydroisomerization reactor, the process 101 charges the entire effluent from the hydrocracking reactor 136 to the hydroisomerization reactor 137 and adjusts the hydroisomerization severity to meet the cold flow property specifications of the resultant distillate fuel and unconverted oil streams.

Referring to the hydroprocessing section 131, the hydroprocessing charge stream in line 126 comprising the hydrotreated liquid stream in line 125 is passed to the hydrocracking reactor 136. In another embodiment, the hydroprocessing charge stream in line 126 comprises the stream of synthesized normal paraffins substantially boiling above a recycle cut point from an F-T synthesis process in line 113. In accordance with the present disclosure, a recycle stream in line 177 is also passed to the hydrocracking reactor 136. In an exemplary embodiment, the recycle stream in line 177 is a recycle UCO stream. The recycle UCO stream in line 177 is hydrocracked to provide the hydrocracked effluent stream. In an exemplary embodiment, the recycle UCO stream in line 177 is separated into a first recycle UCO stream in line 173 and a second recycle UCO stream in line 174. The first recycle UCO stream in line 173 is passed to the hydroprocessing reactor 130 along with the hydroprocessing charge stream in line 126. The second recycle UCO stream in line 174 may be separated into an interbed recycle UCO stream in line 175 and a supplemental recycle UCO stream in line 179. The interbed recycle UCO stream in line 175 may be passed to the hydroisomerization reactor 137 along with the hydrocracked effluent stream. The supplemental recycle UCO stream in line 179 may be passed to the hydrocracking reactor 136. In an aspect, the entire second recycle UCO stream in line 174 may be passed to the hydroisomerization reactor 137 along with the hydrocracked effluent stream. In another aspect, a diesel stream in line 157 may also be passed to the hydrocracking reactor 136 or the hydroisomerization reactor 137 or both.

In an exemplary embodiment, the first recycle stream in line 173 and the hydroprocessing charge stream in line 126 are combined or mixed to provide a hydroprocessing feed stream in line 127. In an embodiment, a hydrocracking reactor feed stream in line 128 is taken from the hydroprocessing feed stream in line 127. The hydrocracking reactor feed stream in line 128 is passed to the hydrocracking reactor 136. A hydrocracking hydrogen stream in line 141 is also passed to the hydrocracking reactor 136. In an embodiment, the hydrocracking reactor feed stream in line 128 is combined with the hydrocracking hydrogen stream in line 141 to provide a combined hydroprocessing feed stream in line 132. The combined hydroprocessing feed stream in line 132 is passed to the hydrocracking reactor 136.

In an embodiment, the hydrocracking reactor 136 comprises a hydrocracking feed inlet 114 and a hydrocracked effluent outlet 115 for discharging a hydrocracked effluent stream. The hydrocracking reactor feed stream in line 128 or the combined hydroprocessing feed stream in line 132 may be charged to the hydrocracking reactor 136 through the feed inlet 114.

The hydrocracking reactor 136 may be a fixed bed reactor that may comprise single or multiple catalyst beds and various combinations of hydrocracking catalyst in one or more vessels. The hydrocracking reactor 136 may be operated in a conventional continuous gas phase, a moving bed or a fluidized bed hydroprocessing reactor. The hydrotreated liquid stream in line 125 and the first recycle UCO stream in line 173 are hydroprocessed over a hydrocracking catalyst in the hydrocracking reactor 136 in the presence of the hydrocracking hydrogen stream to provide a hydrocracked stream.

The hydrocracking reactor 136 may operate at partial conversion of more than about 30 vol % or at least about 90 vol % of the hydrocarbon feed based on total conversion. The hydrocracking reactor 136 may be operated at mild hydrocracking conditions which will provide about 20 to about 60 vol %, preferably about 30 to about 50 vol %, total conversion of the hydrocracking feed stream to product boiling below the recycle cut point.

The hydrocracking catalyst may comprise amorphous silica-alumina or zeolite in a catalyst bases combined with one or more Group VIII or Group VIB metal hydrogenating components to selectively produce a balance of light diesel and jet fuel distillate. In another aspect, a catalyst which comprises, in general, any crystalline zeolite cracking base upon which is deposited a Group VIII metal hydrogenating component may be suitable. Additional hydrogenating components may be selected from Group VIB for incorporation with the zeolitic base.

The zeolites in cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 Angstroms. It is preferred to employ zeolites having a silica/alumina mole ratio between about 3 and about 12, and more preferentially utilizing a zeolite with higher silica/alumina mole ratio of greater than 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8 and 12 Angstroms, wherein the silica/alumina mole ratio is about 4 to 60. One example of a zeolite falling in the preferred group is synthetic Y molecular sieve.

The natural occurring zeolites are normally found in a sodium form, an alkaline earth metal form, or mixed forms. The synthetic zeolites are nearly always prepared in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,100,006.

Mixed polyvalent metal-hydrogen zeolites may be prepared by ion-exchanging with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least about 10 wt %, and preferably at least about 20 wt %, metal-cation-deficient, based on the initial ion-exchange capacity. In another aspect, a desirable and stable class of zeolites is one wherein at least about 20 wt % of the ion exchange capacity is satisfied by hydrogen ions.

The active metals employed in the preferred hydrocracking catalysts of the present disclosure as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 wt % and about 30 wt % may be used. In the case of noble metals, it is normally preferred to use about 0.05 to about 2 wt % noble metal. Noble metals may be preferred as the hydrogenation metal on the hydrocracking catalyst to provide selectivity to jet fuel due to the absence of hydrogen sulfide and ammonia which can deactivate noble metal catalysts, but which have been removed upstream in the process.

In an exemplary embodiment, the hydrocracking catalyst is a noble-metal catalyst.

The method for incorporating the hydrogenation metal is to contact the base material with an aqueous solution of a suitable compound of the desired metal wherein the metal is present in a cationic form. Following addition of the selected hydrogenation metal or metals, the resulting catalyst powder is then filtered, dried, pelleted with added lubricants, binders or the like if desired, and calcined in air at temperatures of, e.g., about 371° C. (700° F.) to about 648° C. (1200° F.) in order to activate the catalyst and decompose ammonium ions. Alternatively, the base component may be pelleted, followed by the addition of the hydrogenation component and activation by calcining.

The foregoing catalysts may be employed in undiluted form, or the powdered catalyst may be mixed and copelleted with other relatively less active catalysts, diluents or binders such as alumina, silica gel, silica-alumina cogels, activated clays and the like in proportions ranging between about 5 and about 90 wt %. These diluents may be employed as such, or they may contain a minor proportion of an added hydrogenating metal such as a Group VIB and/or Group VIII metal. Additional metal promoted hydrocracking catalysts may also be utilized in the process of the present disclosure which comprises, for example, aluminophosphate molecular sieves, crystalline chromosilicates and other crystalline silicates. Crystalline chromosilicates are more fully described in U.S. Pat. No. 4,363,178.

By one approach, the hydrocracking conditions may include a temperature from about 290° C. (550° F.) to about 450° C. (842° F.), preferably 300° C. (572° F.) to about 432° C. (810° F.), a pressure from about 2.7 MPa (gauge) (400 psig) to about 20.7 MPa (gauge) (3000 psig), a LHSV from about 0.4 to less than about 20 $hr^{-1}$ and a hydrogen rate of about 255 $Nm^3/m^3$ (1,500 scf/bbl) to about 2,527 $Nm^3/m^3$ oil (15,000 scf/bbl). In another approach the hydrocracking conditions may include a temperature preferably from about 316° C. (600° F.) to about 399° C. (750° F.), a pressure from about 4.1 MPa (gauge) (600 psig) to about 10.3 MPa (gauge) (1500 psig), a LHSV from about 0.4 to less than about 4 $hr^{-1}$ and a hydrogen rate of about 255 $Nm^3/m^3$ (1,500 scf/bbl) to about 2,527 $Nm^3/m^3$ oil (15,000 scf/bbl).

A hydrocracked stream may exit the hydrocracking reactor 136. In an aspect, the hydrocracked stream is discharged from the outlet 115 and passed to the hydroisomerization reactor 137. In an embodiment, the hydrocracked stream may be fed directly to the hydroisomerization reactor 137. In a further embodiment, the entire hydrocracked stream may be charged to the hydroisomerization reactor 137 with no separation of the hydrocracked stream into components that are withheld from the hydroisomerization reactor 137. The hydroisomerization reactor 137 comprises a hydroisomerization feed inlet 116 for passing a hydroisomerization feed and/or the hydrocracked stream to the hydroisomerization reactor 137, and a hydroisomerized effluent outlet 117 for discharging a hydroisomerized stream. The hydrocracked stream may be passed to the hydroisomerization reactor 137 through the hydroisomerization feed inlet 116.

In accordance with an aspect of the present disclosure, a portion of the hydroprocessing feed stream in line 127 comprising the hydrotreated liquid stream in line 125 may be taken and passed to the hydroisomerization reactor 137 in line 129. In an exemplary embodiment, the hydroprocessing feed stream in line 127 may be split to provide the hydrocracking reactor feed stream in line 128 and a hydroisomerization reactor feed stream in line 129 and processed therein. As shown in FIGURE, the hydroisomerization reactor feed stream in line 129 is passed to the hydroisomerization reactor 137 along with the entire hydrocracked stream from the hydrocracking reactor 136. In an aspect, the hydroisomerization reactor feed stream in line 129 may be passed to the hydroisomerization reactor 137 through the hydroisomerization feed inlet 116. A hydroisomerization hydrogen stream in line 133 may also be passed to the hydroisomerization reactor 137. Since the hydrocracked stream from the hydrocracking reactor 136 comprises hydrogen and the entirety of the hydrocracked stream is passed to the hydroisomerization reactor 137, the hydrogen stream in line 133 may be an optional hydrogen stream. The hydrocracked stream and the hydroisomerization reactor feed stream in line 129 may be hydroisomerized over hydroisomerization catalyst in the presence of the hydroisomerization hydrogen stream. The hydroisomerization reactor 137 may be in direct, downstream communication with the hydrocracking reactor 136. In an exemplary embodiment, the hydroisomerization feed inlet 116 is in direct downstream communication with the hydrocracked effluent outlet 115.

In accordance with the present disclosure, splitting the hydroprocessing feed stream in line 127 comprising the hydrotreated liquid stream in line 125 into the hydrocracking reactor feed stream in line 128 and the hydroisomerization reactor feed stream in line 129 is optional. The entire hydroprocessing feed stream in line 127 may be passed to the hydrocracking reactor 136 in the hydrocracking reactor feed stream in line 128. In another aspect, the entire the hydroprocessing feed stream in line 127 may be passed to the hydroisomerization reactor 137 in the hydroisomerization reactor feed stream in line 129. In an aspect, at least some of the hydroprocessing feed stream in line 127 is passed to hydrocracking reactor 136 and the remainder of the hydroprocessing charge stream is passed to the hydroisomerization reactor 137.

Hydroisomerization, including hydrodewaxing, of the normal hydrocarbons in the hydroisomerization reactor 137 can be accomplished over one or more beds of hydroisomerization catalyst, and the hydroisomerization reactor may be operated in a co-current mode of operation. Fixed bed, trickle bed down-flow or fixed bed liquid filled up-flow modes are both suitable. A quench stream comprising hydrogen may be provided for interbed quenching to the hydroisomerization reactor 137.

Suitable hydroisomerization catalysts may comprise a metal of Group VIII (IUPAC 8-10) of the Periodic Table and a support material. Suitable Group VIII metals include platinum and palladium, each of which may be used alone or in combination. The hydroisomerization catalyst may include non-noble metals which are not as susceptible to sulfur deactivation in a sour environment. Examples of suitable non-noble metals include Ni, Mo, Co, W, Mn, Cu, Zn or Ru. Mixtures of hydrogenation metals may also be used such as Co/Mo, Ni/Mo and Ni/W. The amount of hydrogenation metal or metals may range from 0.1 to 25 wt. %, based on the catalyst weight. Methods of loading metal onto the support material include, for example, impregnation of the support material with a metal salt of the hydrogenation component and heating. The catalyst support material containing the hydrogenation metal may also be sulfided prior to use.

The support material may be amorphous or crystalline. Suitable support materials include amorphous alumina, amorphous silica-alumina, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MgAPSO-11, MgAPSO-31, MgAPSO-41, MgAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. Nos. 4,943,424; 5,087,347; 5,158,665; and 5,208,005. MgAPSO is a MeAPSO, which is an acronym for a metal aluminumsilicophosphate molecular sieve, where the metal, Me, is magnesium (Mg). Suitable MgAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. Nos. 4,795,623 and 4,924,027. Further catalysts and conditions for skeletal isomerization are disclosed in U.S. Pat. Nos. 5,510,306, 5,082,956, and 5,741,759. The hydroisomerization catalyst may also comprise a modifier selected from the group consisting of lanthanum, cerium, prascodymium, neodymium, samarium, gadolinium, terbium, and mixtures thereof, as described in U.S. Pat. Nos. 5,716,897 and 5,851,949. Other suitable support materials include ZSM-22, ZSM-23, and ZSM-35, which are described for use in dewaxing in U.S. Pat. No. 5,246,566 and in the article entitled S. J. Miller, "New Molecular Sieve Process for Lube Dewaxing by Wax Isomerization," 2 Microporous Materials 439-449 (1994). U.S. Pat. Nos. 5,444,032 and 5,608,968 teach a suitable bifunctional catalyst which is constituted by an amorphous silica-alumina gel and one or more metals belonging to Group VIIIA and is effective in the hydroisomerization of long-chain normal paraffins containing more than 15 carbon atoms. U.S. Pat. Nos. 5,981,419 and 5,908,134 teach a suitable bifunctional catalyst which comprises: (a) a porous crystalline material isostructural with beta-zeolite selected from boro-silicate (BOR—B) and boro-alumino-silicate (Al—BOR—B) in which the molar $SiO_2:Al_2O_3$ ratio is higher than 300:1; (b) one or more metal(s) belonging to Group VIIIA, selected from platinum and palladium, in an amount comprised within the range of from 0.05 to 5% by weight. V. Calemma et al., App. Catal. A: Gen., 190 (2000), 207 teaches yet another suitable catalyst. Alumina or silica may be added to the support material.

In an exemplary embodiment, the hydroisomerization catalyst is a noble-metal catalyst.

Hydroisomerization conditions generally include a temperature of about 290° C. (550° F.) to about 450° C. (842° F.) and a pressure of about 2.7 MPa (gauge) (400 psig) to about 20.7 MPa (gauge) (3000 psig). In another embodiment, the hydroisomerization conditions may include a temperature of about 150° C. (302° F.) to about 432° C. (810° F.) and a pressure of about 1724 kPa (abs) (250 psia) to about 13.8 MPa (abs) (2000 psia).

A hydroisomerized stream in a hydroisomerized line 134 from the hydroisomerization reactor 137 is a branched-paraffin-rich stream. The hydroisomerized stream in the hydroisomerized line 134 may be discharged from the hydroisomerized outlet 117 of the hydroisomerization reactor 137. By the term "rich" it is meant that the effluent stream has a greater concentration of branched paraffins than the stream entering the hydroisomerization reactor 137, and preferably comprises greater than 50 mass-% branched paraffins of the total paraffin content. It is envisioned that the hydroisomerized effluent may contain 80, 90 or 95 mass-% branched paraffins of the total paraffin content. The extent of branching is determined by the operating conditions of the hydroisomerization catalyst such that cold flow properties of the jet fuel range, diesel boiling range and unconverted oil achieve the desired cold flow property values such as, but not limited to, freeze point, cloud point and pour point, respectively.

In an exemplary embodiment, the hydrocracking reactor 136 and the hydroisomerization reactor 137 are stacked or located in single vessel 130. In a stacked configuration of the present disclosure, the hydrocracking reactor 136 is placed at a location above the hydroisomerization reactor 137. For a stacked configuration, the combined hydroprocessing feed stream in line 132 is passed to the hydrocracking reactor 136. The hydrocracked stream is withdrawn from the bottom of the hydrocracking reactor 136 and passed to the hydroisomerization reactor 137. The hydroisomerized stream in the hydroisomerized line 134 is withdrawn from the bottoms of the hydroisomerization reactor 137.

The hydroisomerized stream in the hydroisomerized line 134 from the hydroisomerization reactor 137 may flow to a stripper column. In an exemplary embodiment, the hydroisomerized stream in line 134 is separated into vapor and liquid components in a product separation section 161. The product separation section 161 may comprise a hot separator 148, a cold separator 171, a hot flash drum 165, a cold flash drum 191, a hydroisomerization stripper column 140, and a product distillation column 150.

The hydroisomerized stream in line 134 is passed to the hot separator 148. In an aspect, the hydroisomerized stream in line 134 may pass through one or more coolers before being passed to the hot separator 148. The hot separator 148 separates the hydroisomerized stream in line 134 into a first vapor stream in a hot separator overhead line 163 and a first liquid hydrocarbon stream in a hot separator bottoms line 164. The first liquid hydrocarbon stream in line 164 may be passed to the hot flash drum 165. A hot flash drum bottoms stream in line 167 and a hot flash drum overhead stream in line 166 are withdrawn from the hot flash drum 165.

The first vapor stream in line 163 may be passed to the cold separator 171 to provide a vaporous cold separator overhead stream in line 176 and a liquid cold separator bottoms stream in line 178. The first vapor stream in line 163 may pass through the one or more coolers before passing to the cold separator 171. An aqueous stream may be withdrawn from a boot of the cold separator in line 179. The liquid cold separator bottoms stream in line 178 is passed to the cold flash drum 191 and separated. The hot flash drum overhead stream in line 166 may also be passed to the cold flash drum 191. In an aspect, the liquid cold separator bottoms stream in line 178 and the hot flash drum overhead stream in line 166 may be combined to provide a combined stream which is passed to the cold flash drum 191. A cold flash drum bottoms stream in line 194 and a cold flash drum overhead stream in line 193 are withdrawn from the cold flash drum 191. An aqueous stream may be withdrawn from a boot of the cold flash drum in line 169. The cold flash drum bottoms stream in line 194 and the hot flash drum bottoms stream in line 167 may be passed to the hydroisomerization stripper column 140. In an embodiment, the cold flash drum bottoms stream in line 194 and the hot flash drum bottoms stream in line 167 may be combined to provide a combined bottoms stream in line 168. The combined bottoms stream in line 168 is passed to the hydroisomerization stripper column 140. Alternatively, the cold flash drum bottoms stream in line 194 and the hot flash drum bottoms stream in line 167 may be passed separately to the hydroisomerization stripper column 140.

Referring back to the cold separator 171, a portion of the vaporous cold separator overhead stream in line 176 may be passed to an amine scrubber column 180 where it may be treated to remove hydrogen sulfide (H2S), carbon monoxide (CO), carbon dioxide (CO2), and ammonia (NH3) present in the vaporous cold separator overhead stream in line 176. A lean amine stream in line 181 may be introduced to the amine scrubber column 180 for scrubbing the vaporous cold separator overhead stream in line 176. An amine stream 187 rich with components comprising CO, $CO_2$, $NH_3$, $H_2S$ is withdrawn from the bottom of the amine scrubber column 180. In another embodiment of portion of the cold separator overhead stream may be a purge stream. This purge stream can be further processed to recover hydrogen or be used directly as a source stream for syngas production. An overhead recycle stream in line 182 comprising hydrogen may be withdrawn from the amine scrubber column 180. The overhead recycle stream in line 182 may be passed to the hydrotreating reactor section 111. The overhead recycle stream in line 182 may be passed through a compressor 183 to provide a compressed overhead recycle stream in line 184. In an aspect, the compressed overhead recycle stream in line 184 may be passed to the hydrotreating reactor section 111. In an embodiment, the compressed overhead recycle stream in line 184 may be separated into a first overhead recycle stream in line 185 and a second overhead recycle stream in line 186. The first overhead recycle stream in line 185 may be recycled to the hydroprocessing reactor 130. The second overhead recycle stream in line 186 may be passed to the hydrotreating section 110.

Turning back to the product separation section 161, the cold flash drum bottoms stream in line 194 and the hot flash drum bottoms stream in line 167 in the combined bottoms stream in line 168 are separated in the hydroisomerization stripper column 140 to provide a hydroisomerized vapor stream in line 142 and a hydroisomerized liquid stream 144. A suitable stripping media in line 143 is also passed to the hydroisomerization stripper column 140. A stripping media which is an inert gas such as steam from a stripping media line 143 may be used to strip light gases from the hydroisomerized stream in line 134. The hydroisomerized vapor stream in line 142 comprising light gases is taken from the overhead of the hydroisomerization stripper column 140.

The hydroisomerized liquid stream 144 is taken from the bottoms of the hydroisomerization stripper column 140 and passed to a product distillation column 150 for fractionating product streams.

The product distillation column 150 may be reboiled by heat exchange with a suitable hot stream or in a fired heater to provide the necessary heat for the distillation. Alternately, a stripping media which is an inert gas such as steam may be used.

The product distillation column 150 provides an overhead gaseous stream of naphtha and steam in an overhead line 152 and a distillation bottoms liquid stream in a distillation bottoms line 156. The distillation overhead stream may be fully condensed and separated from water in a distillation receiver. The resultant condensed stream comprising naphtha boiling range hydrocarbons with carbon numbers less than nine may be recycled back to an F-T synthesis unit to be reformed into synthesis gas. In another embodiment the naphtha boiling range molecules can be used as a renewable gasoline blending component. In another embodiment the naphtha range molecules can be utilized in another process unit such as a steam cracker or a fluidized catalytic cracking unit to produce renewable olefins.

A product stream may be taken from a side of the product distillation column 150. A side stream comprising a jet fuel range material stream in line 154 may be taken from a side of the product distillation column 150. The jet fuel stream in line 154 may meet the ASTM D7566 jet fuel specification. In one embodiment, the jet fuel range material in line 154 may meet the flash point and the distillation end point specifications of ASTM D7566.

Returning to the product distillation column 150, a diesel boiling range stream in line 155 is also separated. The product distillation column 150 may be operated with a bottoms temperature between about 149° C. (300° F.) and about 399° C. (750° F.), preferably no more than about 371° C. (700° F.), and an overhead pressure of about 0.35 MPa (gauge) (50 psig), preferably no more than about 0.14 MPa (gauge) (20 psig).

A distillation bottoms liquid stream comprising unconverted oil (UCO) is withdrawn in the distillation bottoms line 156. The UCO stream in line 156 may have a viscosity of about 3 to about 12 cst, or a viscosity of about 4.5 to about 9 cst and may comprise heavy polynuclear aromatics (HPNAs). HPNAs are polynuclear aromatics (PNAs) having seven or more aromatic rings. HPNAs can affect the color of lube oil base stock, so may be removed down to very low levels to be acceptable to lubricating base oil. The UCO stream in line 156 may be passed to an adsorber 160 comprising an adsorbent bed to adsorb HPNAs down to below a concentration of no more than 100 wppm. In an exemplary embodiment, the adsorber 160 may comprise activated carbon as an adsorbent. Activated carbon may be derived from various sources including petroleum coke, coal, wood, and shells, such as coconut shells, using carbonization and/or activation process steps. Activation may be accomplished, e.g., by thermal treatment under an atmosphere of carbon dioxide, water, and mixtures thereof, by chemical treating steps, and combinations thereof. Suitable activated carbon is commercially available and may be obtained for example from Calgon Activated Corp. of Compton, Calif., USA.

In the adsorber 160, the UCO stream in line 156 is contacted with an adsorbent such as activated carbon at contacting conditions to remove one or more HPNA compounds and produce a HPNA depleted UCO stream in an HPNA depleted line 162. The HPNA compounds may be removed from the heavy UCO stream by various mechanisms such as distillation, adsorption, reaction, and reactive adsorption with the adsorbent. The HPNA depleted UCO stream has a lower HPNA concentration relative to the HPNA concentration of the heavy UCO stream. The contacting conditions in the adsorber 160 may include a temperature of about 100° C. to about 300° C. and a pressure of about 0.34 MPa (abs) (50 psia) to about 1.7 MPa (abs) (250 psia).

In accordance with an exemplary embodiment, the UCO stream in line 156 may be split into a recycle UCO stream in line 177 and an adsorber feed UCO stream in line 172. The adsorber feed UCO stream in line 172 is passed to the adsorber 160 and contacted with the adsorbent as previously described. The recycle UCO stream in line 177 is recycled to the hydroprocessing reactor 130. The recycle UCO stream in line 177 may be split into the first recycle UCO stream in line 173 and the second recycle UCO stream in line 174 and processed as described previously. In an aspect, a portion of the diesel stream in line 155 may be taken in a recycle diesel stream in line 157 and recycled to the hydrocracking reactor 136 or the hydroisomerization reactor 137 or both. In another aspect, the recycle diesel stream in line 157 may be combined with the first recycle UCO stream in line 173 and the hydroprocessing charge stream in line 126 and passed to the hydroprocessing reactor 130.

In the process 101, the operating conditions of the hydroisomerization reactor 137 are selected to adjust the severity of the hydroisomerization of the hydrocracked effluent stream, and the recycle UCO, so the produced distillate fuel and unconverted oil streams can meet the cold flow property specifications. The unconverted oil comprises isomerized paraffins of higher carbon number which can be recycled to the hydrocracking reactor to produce isomerized paraffins of lower carbon number capable of meeting the distillation specifications of SAF and diesel. The process 101 produces SAF that meets the ASTM D7566 specification while avoiding the requirement of an independent hydroisomerization unit and the associated capital and operating expenditures.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring components, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Example

A simulation study was conducted. The fresh feed to the process was a hydrocracking feed stream. The chemical and physical properties of the hydrocracking feed stream are listed in Table 1 below.

TABLE 1

| Fresh Feed Total Paraffins, wt.-% | 93 |
|---|---|
| Simulated Distillation, wt.-% (° C.) 1/50/99 | 104/365/686 |

The hydrocracking feed stream was processed in a hydrocracking reaction section utilizing noble metal catalyst on amorphous silica-alumina support. The hydrocracking reaction section was operated in the presence of hydrogen at elevated temperature and pressure to produce a hydrocracked stream. The entirety of the hydrocracked stream was passed to the hydroisomerization reaction section. The hydrocracked stream was processed in a hydroisomerization reactor section utilizing noble metal catalyst on SAPO-11 support. The hydroisomerization reactor section was operated in the presence of hydrogen at elevated temperature and pressure to produce a hydroisomerized stream. The hydroisomerized stream was separated into a hydroprocessed vapor stream and a hydroprocessed liquid stream. The hydroprocessed liquid stream was distilled to produce a jet fuel range stream and a diesel boiling range stream that is not converted into a jet fuel range stream. The diesel boiling range stream was passed to the hydrocracking reaction section. The operating conditions, the catalysts, and the jet fuel properties are listed in Table 2 below.

TABLE 2

| Hydrocracking Catalyst | Noble metal catalyst on amorphous silica-alumina support |
|---|---|
| Metals on Catalyst | Pt/Pd |
| Hydroisomerization Catalyst | Noble metal catalyst on SAPO-11 support |
| Metals on Catalyst | Pt/Pd |
| Operating Conditions | |
| Hydrocracking Catalyst Temperature, ° C. | 360-387 |
| Hydroisomerization Catalyst Temperature, ° C. | 330-355 |
| Hydrocracking/ Hydroisomerization Pressure, bar (g) | 49.5-53.3 |
| Jet Fuel Range Stream Property | ASTM D7566 Specification |
| Freeze Point, <−40° C. min. | −41 to −59 |
| Viscosity at −20° C., 8.0 cSt max. | 5.7-6.9 |
| Flash Point, 38° C. min. | >38 |
| ASTM D 86 10% Recovered (T10), 205° C. max. | 167-177 |
| ASTM D 86 Final Boiling Point, 300° C. max. | 290-298 |

TABLE 2-continued

| Diesel Boiling Range Stream Simulated Distillation, wt.-% (° C.) | Resultant Property |
|---|---|
| 1 | 313-319 |
| 50 | 353-363 |
| 90 | 387-418 |

As evident from the results shown in Table 2, the jet fuel range stream met ASTM D7566 specifications for synthetic paraffinic kerosene.

Specific Embodiments

While the following is described in conjunction with specific embodiments, it will be understood that this description is intended to illustrate and not limit the scope of the preceding description and the appended claims.

A first embodiment of the present disclosure is a process for hydroprocessing a sustainable feedstock, the process comprising hydrocracking a hydrocracking feed stream comprising greater than 90% paraffins in a hydrocracking reactor in the presence of hydrogen over a hydrocracking catalyst comprising one or more Group VIII metal and/or Group VIB to provide a hydrocracked stream, wherein the hydrocracking reactor is operated at a temperature of about 290° C. (550° F.) to about 450° C. (842° F.)) and a pressure of about 2.7 MPa (gauge) (400 psig) to about 20.7 MPa (gauge) (3000 psig); and hydroisomerizing the hydrocracked stream in an hydroisomerization reactor in the presence of hydrogen over a hydroisomerization catalyst selected from to provide a hydroisomerized stream, wherein the hydroisomerization reactor is operated at a temperature of about 290° C. (550° F.) to about 450° C. (842° F.)) and a pressure of about 2.7 MPa (gauge) (400 psig) to about 20.7 MPa (gauge) (3000 psig). An embodiment of the present disclosure is one, any or all of prior embodiments in this paragraph up through the first embodiment in this paragraph further comprising hydrotreating a sustainable feed stream in the presence of hydrogen over a hydrotreating catalyst in a hydrotreating reactor to hydrodeoxygenate the sustainable feed stream to provide a hydrotreated stream; and taking the hydrocracking feed stream from the hydrotreated stream and passing the hydrocracking feed stream to the hydrocracking reactor. An embodiment of the present disclosure is one, any or all of prior embodiments in this paragraph up through the first embodiment in this paragraph further comprising taking the hydroisomerized stream from the hydrotreated stream and passing the hydroisomerized stream to the hydroisomerization reactor. An embodiment of the present disclosure is one, any or all of prior embodiments in this paragraph up through the first embodiment in this paragraph wherein the hydrocracking reactor and the hydroisomerization reactor are located in a single vessel. An embodiment of the present disclosure is one, any or all of prior embodiments in this paragraph up through the first embodiment in this paragraph wherein the hydrocracking feed stream comprises greater than 90% normal paraffins. An embodiment of the present disclosure is one, any or all of prior embodiments in this paragraph up through the first embodiment in this paragraph wherein an entirety of the hydrocracked stream is passed to the hydroisomerization reactor. An embodiment of the present disclosure is one, any or all of prior embodiments in this paragraph up through the first embodiment in this paragraph wherein the hydrocracking reactor is at a location above the hydroisomerization reactor in the vessel. An embodiment of the present disclosure is one, any or all of prior embodiments in this paragraph up through the first embodiment in this paragraph further comprising separating the hydroisomerized stream into a hydroprocessed vapor stream and a hydroprocessed liquid stream; and distilling the hydroprocessed liquid stream to produce a jet fuel range stream, a diesel boiling range stream, and an unconverted oil stream. An embodiment of the present disclosure is one, any or all of prior embodiments in this paragraph up through the first embodiment in this paragraph wherein distilling the hydroprocessed liquid stream comprises stripping the hydroprocessed liquid stream in a stripper to provide a stripper overhead stream and a stripper bottoms liquid stream; and distilling the stripper bottoms liquid stream to produce the jet range fuel stream, the diesel boiling range stream, and the unconverted oil stream. An embodiment of the present disclosure is one, any or all of prior embodiments in this paragraph up through the first embodiment in this paragraph further comprising contacting the unconverted oil stream with an adsorbent to remove HPNA compounds having at least seven aromatic rings and provide a treated unconverted oil stream having no more than 100 wppm of aromatic rings. An embodiment of the present disclosure is one, any or all of prior embodiments in this paragraph up through the first embodiment in this paragraph further comprising taking a recycle diesel boiling range stream from the diesel stream and passing the recycle diesel stream to the hydrocracking reactor. An embodiment of the present disclosure is one, any or all of prior embodiments in this paragraph up through the first embodiment in this paragraph wherein the hydrocracking feed stream is a synthesized paraffins stream taken from Fischer-Tropsch synthesis process. An embodiment of the present disclosure is one, any or all of prior embodiments in this paragraph up through the first embodiment in this paragraph wherein the hydrocracking reactor is operated at a LHSV of about 0.4 $hr^{-1}$ to less than about 20 $hr^{-1}$. An embodiment of the present disclosure is one, any or all of prior embodiments in this paragraph up through the first embodiment in this paragraph wherein the hydroisomerization reactor is operated at a LHSV of about 0.4 $hr^{-1}$ to less than about 20 $hr^{-1}$. An embodiment of the present disclosure is one, any or all of prior embodiments in this paragraph up through the first embodiment in this paragraph, wherein the hydrocracking catalyst is a noble-metal catalyst. An embodiment of the present disclosure is one, any or all of prior embodiments in this paragraph up through the first embodiment in this paragraph, wherein the hydroisomerization catalyst is a noble-metal catalyst.

A second embodiment of the present disclosure is a process for hydroprocessing a sustainable feedstock, the process comprising hydrotreating a paraffins stream to provide a hydrotreated stream, the paraffins stream comprising greater than 90% normal paraffins; hydrocracking a hydrocracking feed stream taken from the hydrotreated stream in a hydrocracking reactor in the presence of hydrogen over a hydrocracking catalyst comprising one or more Group VIII metal and/or Group VIB to provide a hydrocracked stream, wherein the hydrocracking reactor is operated at a temperature of about 290° C. (550° F.) to about 450° C. (842° F.) and a pressure of about 2.7 MPa (gauge) (400 psig) to about 20.7 MPa (gauge) (3000 psig); and hydroisomerizing an entirety of the hydrocracked stream in an hydroisomerization reactor in the presence of hydrogen over a hydroisomerization catalyst selected from to provide a hydroisomerized stream, wherein the hydroisomerization reactor is operated at a temperature of about 290° C. (550° F.) to about 450° C. (842° F.) and a pressure of about 2.7 MPa (gauge) (400 psig) to about 20.7 MPa (gauge) (3000 psig). An embodiment of the present disclosure is one, any or all of prior embodiments in this paragraph up through the second embodiment in this paragraph wherein the paraffins stream taken from Fischer-Tropsch synthesis process. An embodiment of the present disclosure is one, any or all of prior embodiments in this paragraph up through the second embodiment in this paragraph wherein the paraffins stream comprises greater than 90% normal paraffins. An embodiment of the present disclosure is one, any or all of prior embodiments in this paragraph up through the second embodiment in this paragraph wherein an entirety of the hydrocracked stream is passed to the hydroisomerization reactor. An embodiment of the present disclosure is one, any or all of prior embodiments in this paragraph up through the second embodiment in this paragraph wherein the hydrocracking reactor and the hydroisomerization reactor are located in a single vessel.

A third embodiment of the present disclosure is an apparatus for hydroprocessing a sustainable feedstock, comprising a hydrocracking reactor having a hydrocracking feed inlet and a hydrocracked effluent outlet; and a hydroisomerization reactor having a hydroisomerization feed inlet and a hydroisomerized effluent outlet, wherein the hydroisomerization feed inlet is in direct downstream fluid communication with the hydrocracked effluent outlet. An embodiment of the present disclosure is one, any or all of prior embodiments in this paragraph up through the first embodiment in this paragraph, wherein the hydrocracking reactor and the hydroisomerization reactor are located in a single vessel. An embodiment of the present disclosure is one, any or all of prior embodiments in this paragraph up through the third embodiment in this paragraph, wherein the hydrocracking reactor is stacked on the hydroisomerization reactor.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the present disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for hydroprocessing a sustainable feedstock, the process comprising:
   hydrocracking a hydrocracking feed stream comprising greater than 90% paraffins in a hydrocracking reactor in the presence of hydrogen over a hydrocracking catalyst comprising one or more Group VIII metal and/or Group VIB to provide a hydrocracked stream, wherein the hydrocracking reactor is operated at a temperature of about 290° C. (550° F.) to about 450° C. (842° F.) and a pressure of about 2.7 MPa (gauge) (400 psig) to about 20.7 MPa (gauge) (3000 psig);
   hydroisomerizing said hydrocracked stream in an hydroisomerization reactor in the presence of hydrogen over a hydroisomerization catalyst to provide a hydroisomerized stream, wherein the hydroisomerization reactor is operated at a temperature of about 290° C.

(550° F.) to about 450° C. (842° F.) and a pressure of about 2.7 MPa (gauge) (400 psig) to about 20.7 MPa (gauge) (3000 psig)

separating said hydroisomerized stream into a hydroprocessed vapor stream and a hydroprocessed liquid stream;

stripping said hydroprocessed liquid stream in a stripper to provide a stripper overhead stream and a stripper bottoms liquid stream; and distilling said stripper bottoms liquid stream to produce a jet fuel range stream.

2. The process of claim 1 further comprising:

hydrotreating a feed stream in the presence of hydrogen over a hydrotreating catalyst in a hydrotreating reactor to hydrodeoxygenate said sustainable feed stream to provide a hydrotreated stream; and taking said hydrocracking feed stream from said hydrotreated stream and passing said hydrocracking feed stream to the hydrocracking reactor.

3. The process of claim 2 further comprising:

taking a hydroisomerization reactor feed stream from said hydrotreated stream and passing said hydroisomerization reactor feed stream to the hydroisomerization reactor.

4. The process of claim 1, wherein the hydrocracking reactor and the hydroisomerization reactor are located in a single vessel.

5. The process of claim 1, wherein said hydrocracking feed stream comprises greater than 90% normal paraffins.

6. The process of claim 1, wherein an entirety of said hydrocracked stream is passed to the hydroisomerization reactor.

7. The process of claim 4, wherein the hydrocracking reactor is at a location above the hydroisomerization reactor in the vessel.

8. The process of claim 1, wherein distilling said hydroprocessed liquid stream further comprises:

distilling said stripper bottoms liquid stream to produce said jet fuel range stream, a diesel boiling range stream, and an unconverted oil stream.

9. The process of claim 1 further comprising contacting said unconverted oil stream with an adsorbent to remove HPNA compounds having at least seven aromatic rings and provide a treated unconverted oil stream having no more than 100 wppm of the HPNA compounds.

10. The process of claim 1, wherein said hydrocracking feed stream is a synthesized paraffins stream taken from Fischer-Tropsch synthesis process.

11. The process of claim 1, wherein said hydrocracking catalyst is a noble-metal catalyst.

12. The process of claim 1, wherein said hydroisomerization catalyst is a noble-metal catalyst.

13. A process for hydroprocessing a sustainable feedstock, the process comprising:

hydrotreating a paraffins stream to provide a hydrotreated stream, said paraffins stream comprising greater than 90% normal paraffins;

hydrocracking a hydrocracking feed stream taken from said hydrotreated stream in a hydrocracking reactor in the presence of hydrogen over a hydrocracking catalyst comprising one or more Group VIII metal and/or Group VIB to provide a hydrocracked stream, wherein the hydrocracking reactor is operated at a temperature of about 290° C. (550° F.) to about 450° C. (842° F.) and a pressure of about 2.7 MPa (gauge) (400 psig) to about 20.7 MPa (gauge) (3000 psig);

hydroisomerizing an entirety of said hydrocracked stream in an hydroisomerization reactor in the presence of hydrogen over a hydroisomerization catalyst to provide a hydroisomerized stream, wherein the hydroisomerization reactor is operated at a temperature of about 290° C. (550° F.) to about 450° C. (842° F.) and a pressure of about 2.7 MPa (gauge) (400 psig) to about 20.7 MPa (gauge) (3000 psig);

separating said hydroisomerized stream into a hydroprocessed vapor stream and a hydroprocessed liquid stream;

distilling said hydroprocessed liquid stream to produce a jet fuel range stream, a diesel boiling range stream or an unconverted oil stream; and contacting said unconverted oil stream with an adsorbent to remove HPNA compounds having at least seven aromatic rings and provide a treated unconverted oil stream having no more than 100 wppm of the HPNA compounds.

14. The process of claim 13, wherein said paraffins stream is taken from a Fischer-Tropsch synthesis process.

15. The process of claim 13, wherein said paraffins stream comprises greater than 90% normal paraffins.

16. The process of claim 13, wherein an entirety of said hydrocracked stream is passed to the hydroisomerization reactor.

17. The process of claim 13, wherein the hydrocracking reactor and the hydroisomerization reactor are located in a single vessel.

* * * * *